(12) United States Patent
Lang et al.

(10) Patent No.: US 9,248,520 B2
(45) Date of Patent: Feb. 2, 2016

(54) DEVICE FOR TORSIONALLY WELDING METAL PARTS BY MEANS OF ULTRASOUND

(71) Applicant: Telsonic Holding AG, Bronschhofen (CH)

(72) Inventors: Georg Lang, Tiefenstein (DE); Albert Büttiker, Kirchberg (CH)

(73) Assignee: Telsonic Holding AG, Bronschhofen (CH)

( * ) Notice: Subject to any disclaimer, the term of this patent is extended or adjusted under 35 U.S.C. 154(b) by 0 days.

(21) Appl. No.: 14/492,476

(22) Filed: Sep. 22, 2014

(65) Prior Publication Data

US 2015/0008250 A1 Jan. 8, 2015

Related U.S. Application Data

(62) Division of application No. 13/988,742, filed as application No. PCT/EP2011/070558 on Nov. 21, 2011, now Pat. No. 8,840,005.

(30) Foreign Application Priority Data

Nov. 25, 2010 (EP) ..................................... 10192554

(51) Int. Cl.
*B23K 1/06* (2006.01)
*B23K 20/10* (2006.01)

(52) U.S. Cl.
CPC ................. *B23K 20/106* (2013.01); *B23K 1/06* (2013.01); *B23K 20/10* (2013.01)

(58) Field of Classification Search
None
See application file for complete search history.

(56) References Cited

U.S. PATENT DOCUMENTS

| | | | |
|---|---|---|---|
| 3,184,841 A | | 5/1965 | Jones et al. |
| 3,361,318 A | * | 1/1968 | Nowisch ........................ 228/1.1 |
| 3,438,428 A | * | 4/1969 | Balamuth et al. ............... 165/47 |
| 3,695,500 A | | 10/1972 | Walraven et al. |
| 4,131,505 A | * | 12/1978 | Davis, Jr. ................... 156/580.1 |
| 4,767,492 A | | 8/1988 | Fukusima et al. |
| 4,782,990 A | * | 11/1988 | Patrikios et al. .............. 228/1.1 |
| 4,842,671 A | * | 6/1989 | Nuss .............................. 156/433 |
| 4,975,133 A | * | 12/1990 | Gochermann ................ 156/73.1 |
| 5,197,371 A | * | 3/1993 | van der Heijden et al. .. 92/162 P |
| 5,293,809 A | * | 3/1994 | Van Der Heijden et al. ... 91/392 |

(Continued)

FOREIGN PATENT DOCUMENTS

| | | |
|---|---|---|
| DE | 4410218 | 9/1998 |
| DE | 19810621 | 9/1999 |

(Continued)

*Primary Examiner* — Kiley Stoner
(74) *Attorney, Agent, or Firm* — Davis & Bujold PLLC; Michael J. Bujold

(57) ABSTRACT

A device for ultrasonically welding metal parts includes a sonotrode whose head can be excited by a vibration generator to produce vibrations. The sonotrode is connected to the vibrator with a screw connection provided on one side of the sonotrode. The sonotrode head may have at least one welding surface relative to the torsion axis on the circumference side. An anvil having a counter/compacting surface may be arranged opposite the welding surface of the sonotrode in a stationary position. The welding surface and the compacting surface may delimit a compaction space to receive parts to be welded. The entire sonotrode may be excited to produce torsional oscillation with a negligibly small longitudinal vibration component.

20 Claims, 10 Drawing Sheets

(56) References Cited

U.S. PATENT DOCUMENTS

| | | | |
|---|---|---|---|
| 5,476,570 A * | 12/1995 | Widmann | 156/515 |
| 5,603,444 A * | 2/1997 | Sato | 228/1.1 |
| 5,662,766 A * | 9/1997 | Ishikawa et al. | 156/580.2 |
| 5,730,832 A * | 3/1998 | Sato et al. | 156/499 |
| 5,830,300 A | 11/1998 | Suzuki et al. | |
| 5,865,946 A * | 2/1999 | R.ang.be | 156/580.1 |
| 5,884,831 A * | 3/1999 | Sato et al. | 228/6.2 |
| 5,947,364 A * | 9/1999 | Tamura et al. | 228/1.1 |
| 6,078,125 A * | 6/2000 | Roberts | 310/325 |
| 6,109,502 A * | 8/2000 | Sato | 228/1.1 |
| 6,168,063 B1 * | 1/2001 | Sato et al. | 228/1.1 |
| 6,173,878 B1 * | 1/2001 | Stroh | 228/1.1 |
| 6,247,628 B1 * | 6/2001 | Sato et al. | 228/1.1 |
| 6,266,051 B1 | 7/2001 | Holtzman | |
| 6,280,566 B1 * | 8/2001 | Naito et al. | 156/580.1 |
| 6,491,785 B1 * | 12/2002 | Sato et al. | 156/379.6 |
| 6,605,178 B1 * | 8/2003 | Shinohara et al. | 156/379.6 |
| 6,802,920 B2 | 10/2004 | Shinohara et al. | |
| 7,484,650 B2 * | 2/2009 | Szucher | 228/1.1 |
| 7,698,797 B2 | 4/2010 | Hetrick et al. | |
| 2002/0053405 A1 * | 5/2002 | Sans | 156/379.8 |
| 2003/0006265 A1 * | 1/2003 | Sato | 228/1.1 |
| 2003/0136523 A1 * | 7/2003 | Takahashi et al. | 156/580.1 |
| 2003/0168938 A1 | 9/2003 | Wallaschek et al. | |
| 2003/0201053 A1 | 10/2003 | Young | |
| 2004/0011452 A1 | 1/2004 | Capodieci | |
| 2004/0038598 A1 | 2/2004 | Steiner et al. | |
| 2004/0065415 A1 * | 4/2004 | Sato et al. | 156/580.1 |
| 2004/0211812 A1 * | 10/2004 | Hizukuri et al. | 228/1.1 |
| 2004/0245893 A1 * | 12/2004 | Li et al. | 310/323.19 |
| 2006/0071054 A1 | 4/2006 | Bolser et al. | |
| 2006/0097028 A1 * | 5/2006 | Kainuma et al. | 228/110.1 |
| 2006/0231585 A1 * | 10/2006 | Dieterle | 228/101 |
| 2007/0144680 A1 * | 6/2007 | Kawada et al. | 156/580.1 |
| 2007/0199972 A1 * | 8/2007 | Chong et al. | 228/1.1 |
| 2007/0257086 A1 | 11/2007 | Schroeder | |
| 2008/0128471 A1 | 6/2008 | Eberbach | |
| 2009/0013786 A1 * | 1/2009 | Gassert | 73/579 |
| 2009/0266869 A1 * | 10/2009 | Sato et al. | 228/1.1 |
| 2009/0277951 A1 * | 11/2009 | Ebihara et al. | 228/110.1 |
| 2009/0283569 A1 | 11/2009 | Ramaswamy et al. | |
| 2010/0006235 A1 * | 1/2010 | Patrikios et al. | 156/580.1 |
| 2010/0040903 A1 | 2/2010 | Kalt et al. | |
| 2010/0078115 A1 | 4/2010 | Lang | |
| 2010/0170935 A1 | 7/2010 | Stroh | |
| 2010/0206487 A1 * | 8/2010 | Arai et al. | 156/379.6 |
| 2010/0320255 A1 * | 12/2010 | Sato et al. | 228/1.1 |
| 2010/0320257 A1 | 12/2010 | Buttiker | |
| 2011/0259939 A1 * | 10/2011 | Farassat | 228/1.1 |
| 2013/0075454 A1 * | 3/2013 | Buettiker | 228/110.1 |
| 2013/0240605 A1 * | 9/2013 | Wong et al. | 228/1.1 |

FOREIGN PATENT DOCUMENTS

| | | |
|---|---|---|
| DE | 10249569 | 5/2004 |
| DE | 102007026707 | 9/2008 |
| EP | 0143936 | 6/1985 |
| EP | 1516689 | 9/2003 |
| WO | 95/23668 | 9/1995 |
| WO | 2006/051121 | 5/2006 |
| WO | 2011/138404 | 11/2011 |

* cited by examiner

DEVICE FOR TORSIONALLY WELDING METAL PARTS BY MEANS OF ULTRASOUND

This application is a division of application Ser. No. 13/988,742, filed May 21, 2013, which was the U.S. national stage entry of international application Ser. No. PCT/EP2011/070558, filed Nov. 21, 2011.

BACKGROUND OF THE INVENTION

The invention relates to an ultrasonic welding device for welding cables, for example strands. The invention also relates to a mobile ultrasonic welding apparatus.

Cables here are understood to be cables having one or more strands and also individual wires or electrically conductive lines. However, it is possible, in principle, for a cable to be a terminal, i.e. a rigid electrical connection.

In the case of known devices of this type, ultrasonic vibration is introduced parallel to a welding surface, wherein a compacting force is exerted simultaneously in a direction perpendicular thereto, for example via a compacting or abutment surface. A compacting or welding space, in which the welding material is compressed, i.e. compacted, before and during the welding operation, is typically provided here. In particular for welding strands, it is necessary, for the purpose of achieving a durable weld, for the individual wires to be compressed by a comparatively large force during welding. During the welding operation, on account of the compacted welding material moving in relation to one another, the ultrasonic vibration results in the parts being connected, i.e. in welding taking place.

In a large number of industrial applications, in particular in the automobile industry, there is a need for it to be possible for already installed and/or difficult-to-access parts to be connected by means of ultrasonic welding. For example, in the case of the production of cable harnesses for vehicles, these being prefabricated on a board, the individual cables, in some cases, can be raised merely by approximately 4 cm. In particular, there is also increasingly the need to use ultrasonic welding to connect not just copper, but also materials which oxidize to a pronounced extent, for example aluminum. For this purpose, it is necessary for the highest possible level of power to be introduced into the welding region, in order to create a durable welding connection despite the oxide layer.

DE 10 2007 026 707 B3 discloses a device for connecting aluminum strands in an electrically conductive manner. A sonotrode here has a welding surface which is in direct contact with the aluminum strand. The sonotrode, which vibrates in its longitudinal direction, subjects the strands, in the longitudinal direction thereof, to ultrasonic vibration, and therefore the strands are welded to one another. For this purpose, the strands have to be arranged in the longitudinal direction of the sonotrode, which requires a large amount of space and presupposes that the parts which are to be welded allow for a corresponding arrangement in the first place.

EP 0 143 936 B1 proposes, for space-saving welding purposes, that a welding or compacting space of a device should be formed perpendicularly to the longitudinal axis of the sonotrode, and therefore it is also the case that the parts which are to be welded can be arranged perpendicularly to the sonotrode axis. However, the parts here are subjected to the ultrasonic vibration transversely to the compacting space, and thus transversely to their longitudinal direction, as a result of which only a low level of effective power is introduced. It is thus barely possible to effect metal welding of, for example, strands, in particular those made of aluminum.

WO 95/23668 A1 proposes to excite a sonotrode head to perform simultaneous longitudinal and torsional vibrations, wherein the vibration energy is taken off at the circumference. This makes it possible to arrange a compacting space perpendicularly to the sonotrode axis and, nevertheless, for the parts which are to be welded to be subjected to the ultrasonic vibration in their longitudinal direction up to a certain degree. However, it has been found that, on account of the design and excitation of the sonotrode, configuration of the compacting space requires high outlay in design terms and comparatively large tolerances. It is also possible, during the welding of strands, for ultrasonic vibrations introduced transversely to the strand direction to have an adverse effect on the welding since these vibrations disrupt the compacted arrangement of the wires (individual wires "roll", rather than rub), as a result of which it is also the case that the vibrations can become less effective in the longitudinal direction. Similarly, miniaturizing the sonotrodes is limited by design, since the dimensions of the oblique slots of the converter which are necessary for generating the torsional vibration cannot fall below a certain minimum level. Not least is the design of the slots complex and therefore costly.

SUMMARY OF THE INVENTION

It is therefore an object of the invention to avoid the disadvantages of the prior art and to provide, in particular, a versatile ultrasonic welding device which is of straightforward design and allows space-saving, efficient and durable welding, in particular on a cable harness. The device here should also make it possible, in particular, to weld strands made of copper and of aluminum. It is also an object of the invention to provide a mobile welding apparatus.

The object is achieved according to the invention in that the device for welding metal parts by means of ultrasound comprises a sonotrode with a sonotrode head, which can be excited by a vibration generator to perform torsional vibrations in relation to a torsion axis. A welding surface is arranged circumferentially here on the sonotrode head, as seen in relation to the torsion axis. An anvil with a compacting surface is also present, it being possible for this to be arranged opposite the welding surface of the sonotrode, in a fixed state in relation to the same. In the case of an opposite arrangement, the welding surface and the compacting surface delimit a compacting space, provided for accommodating parts which are to be welded, in a direction perpendicular to the torsion axis. The invention is distinguished in that the sonotrode is designed, and coupled to the vibration generator, such that the sonotrode as a whole can be excited to perform torsional vibration with a negligibly small longitudinal-vibration component. In other words, the vibration generator is designed for generating longitudinal vibrations and is arranged perpendicularly to the torsion axis, wherein the vibration generator is in contact with a torsion vibrator, on which the sonotrode is fitted in a rotationally fixed manner, at a radial distance from the torsion axis, in particular tangentially.

Since, according to the invention, the sonotrode as a whole can be made to perform torsional vibration, the longitudinal-vibration component, which is barely avoidable in practice, can be reduced to a negligibly low level. A negligibly small longitudinal-vibration component is understood here, and herein below, to mean a longitudinal-vibration component which has a longitudinal amplitude which is less than 1% of the torsional operating amplitude, preferably less than 0.5%. It has even been found that, in practice, the device according to the invention achieves amplitudes for the longitudinal-vibration component which are only approximately 0.2% of the operating amplitude.

On the one hand, this results in largely all the vibration energy fed by the vibration generator being available in the torsional vibration of the sonotrode, and therefore optimum power transmission takes place even in the case of welding material being arranged perpendicularly to the torsion axis.

On the other hand, an operating region of the sonotrode, in the present case the sonotrode head with welding surface formed thereon, describes a well-defined rotary movement without any significant deflection in the longitudinal direction. Adjacent fixed or displaceable parts of the device can therefore be respectively installed on, and pushed onto, the sonotrode head with considerably lower tolerances, without account having to be taken of any vibration amplitudes occurring in the longitudinal direction. In particular the compacting or welding space, which is delimited on one side by the welding surface of the sonotrode can be delimited in a comparatively precise manner by it being possible for delimiting elements to be arranged in very close proximity to the sonotrode head even in the direction of the torsion axis. This makes it possible, for example, to prevent the situation where particularly fine wires, during the compacting operation in the compacting space, can enter into gaps between delimiting elements of the compacting space and get caught there.

The vibration generator of the device according to the invention, this generator also being referred to in the art as a converter, is therefore advantageously designed for generating longitudinal vibrations and is arranged perpendicularly to the torsion axis of the sonotrode. Such vibration generators are in widespread use, and it is therefore possible to use cost-effective standard components. Since the vibration generator is arranged perpendicularly and in a laterally offset manner in relation to the torsion axis, it is possible to use suitable, direct or indirect, coupling to the sonotrode to convert the longitudinal vibration of the generator into torsional vibration of the sonotrode as a whole. It is also conceivable for two or more vibration generators to interact with the sonotrode in order to generate the torsional vibration, wherein these generators are then cyclically controlled, for example alternately, depending on their arrangement and/or number.

In order to excite the torsional vibration of the sonotrode, the vibration generator preferably interacts with the sonotrode via a torsional vibrator, which is coupled to the sonotrode in respect of torsional vibration. The torsional vibrator may be designed, for example, as an axial body which is arranged coaxially in relation to the torsion axis and at one end region of which the sonotrode is fastened in a rotationally fixed manner.

For fastening on the torsional generator, the sonotrode is preferably screw-connected thereto. In the case of known screw connections between sonotrodes and torsional vibrators, a blind hole with an internal thread is formed on a respective fastening end side both of the sonotrode and of the torsional vibrator. The sonotrode is screw-connected to the torsional vibrator via a grub screw on either side. The difficulty with such a screw connection, however, is that of aligning the sonotrode in respect of rotation about the longitudinal axis, since it is necessary for the sonotrode to be able to rotate during fastening. In the present case, however, the sonotrode preferably has a one-sided screw connection, in the case of which advantageously a fastening screw is screwed into the torsional vibrator in the direction of the torsion axis so as to be supported on the sonotrode from the sonotrode head. For this purpose, the sonotrode preferably has, in the longitudinal direction, a central countersunk hole which is accessible from the sonotrode head and, in the direction of the fastening end side, has a longitudinally continuous bore on the floor of the countersunk hole. It is thus possible for a screw to be screwed longitudinally through the bore, from the sonotrode head, into the internal thread on the torsional vibrator and for the sonotrode to be fastened on the torsional vibrator. A screw head can be arranged in the countersunk hole and supported on a floor of the countersunk hole. This makes it possible for alignment of the sonotrode in respect of rotation to be straightforwardly predetermined, and fixed by virtue of the screw being tightened. In particular there is no need for the sonotrode to be rotatable in relation to the torsional vibrator during the fastening operation.

It goes without saying that the screw connection can, of course, also take place in the reverse order, i.e. the countersunk hole is formed for access from a rear longitudinal end of the torsional vibrator in the longitudinal direction thereof and the internal thread is formed in the sonotrode. In this case, the screw connection takes place from the torsional vibrator into the internal thread of the sonotrode, wherein the screw head is supported in the countersunk hole on the torsional vibrator. It likewise goes without saying that this fastening principle (screw connection on one side) of the sonotrode on the torsional vibrator is also advantageous as an aspect in its own right and can be used for other sonotrodes.

A region at a longitudinal end of the axial-body-design torsional vibrator which is located opposite the fastening region of the sonotrode may be provided, for example, for contact with the vibration generator. For vibration-isolated mounting on a housing of the device, the axial body can be supported on the housing, for example, in a known manner in a vibration node of the excited vibration mode.

In order to excite the torsional vibration in the torsional vibrator and the sonotrode, which is connected thereto, an activator of the vibration generator is in contact with the torsional vibrator, preferably at a radial distance from the torsion axis. It is particularly straightforward to achieve contact in a region tangential to the cross section of the torsional vibrator. Since the activator is in contact with the torsional vibrator at a radial distance from the torsion axis, the torsional vibrator is subjected to a torque about the torsion axis. It is thus readily possible for the longitudinal vibration, which can be picked up at the activator, to be converted directly into torsional vibration of the torsional vibrator. Since the vibration generator is arranged perpendicularly to the torsion axis, the torsional vibrator is subjected only to a torque about the torsion axis, without any longitudinal force components.

The torsion axis preferably coincides with a longitudinal axis of the sonotrode. It is advantageous here for the sonotrode to be designed in an axis-symmetrical manner in relation to the longitudinal axis, and this therefore means that there is no unbalance in relation to the torsion axis. In the case of a torsional vibrator, the latter is preferably likewise designed in an axis-symmetrical manner in relation to its longitudinal axis, wherein the longitudinal axis coincides with the torsion axis.

In a preferred embodiment, the sonotrode head protrudes in a flange-like manner, transversely to the torsion axis, at a free end of the sonotrode. The flange-like sonotrode head advantageously has, in the longitudinal direction, two plane-parallel surfaces oriented transversely to the torsion axis. A distance between the surfaces in the direction of the torsion axis here defines a thickness of the sonotrode head. It is advantageous here for the welding surface to extend over the entire longitudinal dimension, i.e. the thickness of the sonotrode head. As a result, on the one hand, the welding surface, irrespective of the rest of the design of the sonotrode, may be arranged at largely any desired radial distance from the torsion axis. On the other hand, the entire thickness of the flange can be used for vibration transmission at the welding surface. The flange may therefore be of comparatively thin design.

In a preferred embodiment, the flange-like sonotrode head comprises two lugs which are formed symmetrically in a direction transverse to the torsion axis and of which at least one has the welding surface on the circumference. The vibrating mass of the sonotrode head can thus be reduced further in relation to a completely annular flange. In a modification, it is possible for the two lugs to have a welding surface on the circumference, and therefore, when the one welding surface is worn, the sonotrode can be rotated through 180 degrees in relation to the torsion axis, in order to arrange the other welding surface for use at the compacting or welding space. For this purpose, the sonotrode may have a fastening means which allows it to be fastened on the torsional vibrator in a removable manner and in various positions. It goes without saying that it is also possible, for other designs of the sonotrode head, to provide a plurality of welding surfaces which can be arranged for use at the compacting or welding space by virtue of the sonotrode being fastened in various rotary positions on the torsional vibrator. In a further preferred embodiment, the sonotrode head therefore preferably comprises generally at least two or more, preferably four, welding surfaces formed on the circumference.

The compacting space is delimited preferably by an outer lateral slide and an inner lateral slide in the direction of the torsion axis. The lateral slides therefore define a length of the compacting space in the longitudinal direction, i.e. in the direction of the torsion axis.

The compacting space here is preferably designed to be continuous, and to open outward, in a direction perpendicular to the torsion axis. It is thus possible for the welding material, e.g. one or more cables, to be arranged in the compacting space in a direction transverse to the torsion axis.

It is advantageous, in particular in the case of fixed lateral slides, for the compacting space to be delimited by the lateral slides on either side of the welding surface of the sonotrode, and for the sonotrode head to be arranged, at least in part, in an interspace between the lateral slides. It is preferable here for a distance between the lateral slides in the direction of the torsion axis to correspond to a dimension of the sonotrode head in this direction. The aforementioned dimensional correspondence is understood in the framework of a tolerance which ensures free torsional vibration of the sonotrode head.

Such an arrangement is made possible for the first time by the excited torsional vibration with negligible longitudinal-vibration component of the sonotrode head according to the invention. Otherwise, on account of the longitudinal-vibration amplitude, the lateral slides would have to be spaced apart from the sonotrode head and/or corresponding apertures would have to be present, and these could give rise to possibly undesired free spaces between the sonotrode head and lateral slide.

It is preferred here for the outer lateral slide to be arranged in front of the sonotrode head, as seen in the direction of the torsion axis, and to fully cover over preferably an end side of the sonotrode. Since the outer lateral slide fully covers over the sonotrode head, the latter is outwardly protected against mechanical effects. The outer lateral slide may be of comparatively thin design here, and therefore the compacting space can be moved close up to the welding material in the axial direction.

In particular in the case of an embodiment with longitudinally fixed lateral slides, it is advantageous for the inner lateral slide and the outer lateral slide to be arranged such that they can be jointly displaced in relation to the sonotrode in a direction perpendicular to the torsion axis. For this purpose, for example a longitudinal guide which is oriented transversely to the torsion axis is formed, and the lateral slides can be displaced in a guided manner thereon. It is thus possible for the sonotrode head to be arranged in the interspace between the lateral slides by virtue of the lateral slides being displaced to a more or less pronounced extent.

The inner lateral slide and the outer lateral slide here are advantageously mounted jointly on a carriage, which is guided such that it can be displaced in relation to the sonotrode perpendicularly to the torsion axis, and therefore, during displacement of the carriage, the sonotrode head can be introduced into the interspace between the lateral slides or moved out of the same. It goes without saying that it is also the case that just one of the lateral slides can be mounted on the carriage, while the other is fixed in a direction perpendicular to the torsion axis.

In an embodiment which may possibly be preferred, it is possible for at least one of the lateral slides to be designed such that it can be displaced in the direction of the torsion axis. For this purpose, the lateral slide preferably has an aperture which essentially, i.e. within the framework of a tolerance necessary for the vibration of the sonotrode, leaves free a region of a projection of the sonotrode head in the direction of the torsion axis, in particular in the region of the welding surface. This means that the at least one lateral slide can be displaced into a length region of the sonotrode head and/or the welding surface thereof, wherein a lateral-slide inner surface, which is directed toward the compacting space, follows the welding surface, with the smallest possible gap therebetween. The lateral slide can thus be displaced towards the other lateral slide in the torsion-axis direction and therefore makes it possible to reduce the dimension of the compacting space in the direction of the torsion axis. In particular it is possible, in this case, for the dimension of the compacting space in this direction to be reduced irrespective of the longitudinal dimension of the sonotrode head.

It is preferably the outer lateral slide which can be displaced in the longitudinal direction, while the inner lateral slide is arranged in a longitudinally fixed position. The lateral slide which can be displaced in the longitudinal direction need not be displaceable here in the radial direction in relation to the torsion axis. In this case, it is possible for the anvil to strike longitudinally, for example by way of an end side, against the inner surface of the at least one lateral slide, this inner surface being directed toward the compacting space, in order for the compacting space to be closed off fully in the radially outward direction. When the at least one lateral slide is displaced in the direction of the torsion axis, the anvil can correspondingly be displaced along with it.

It is also conceivable, in principle, for just the inner lateral slide or for the two lateral slides to be configured so as to be displaceable in the direction of the torsion axis. These variants, however, usually involve a higher level of outlay.

It is advantageous for the at least one lateral slide to be mounted directly or indirectly on a device-mounted displacement guide such that it can be displaced in the direction of the torsion axis, wherein preferably an electric drive, in particular with a spindle drive, is present for displacement purposes. The drive can use, for example, a spindle drive to act on a displacement body which is guided on the device-mounted displacement guide, and to which the lateral slide is connected rigidly directly or indirectly. It goes without saying that the displacement can also take place pneumatically, hydraulically or via other drives.

It is advantageous for the anvil to be mounted on the carriage or on one of the lateral slides, in particular on the inner lateral slide, such that the anvil can be displaced transversely to the torsion axis together with said lateral slides, wherein the anvil is arranged such that it can be displaced in the direction of the sonotrode during displacement of the carriage or of the lateral slide.

It is preferable here for the anvil to be arranged such that it can be displaced, in addition, in a direction parallel to the torsion axis, and therefore the anvil can be moved into an extended position, in which it projects beyond the lateral slide and the abutment or compacting surface of the anvil is located opposite the welding surface of the sonotrode. In addition, the anvil is also advantageously displaceable into a retracted position, in which it terminates in the longitudinal direction with the lateral slide, and therefore the compacting space is accessible in order for welding material to be introduced.

It is preferable for the anvil, in the extended position, to close off the compacting space fully outward in a direction perpendicular to the torsion axis. In other words, the anvil, in the extended position, fully spans the distance between the lateral slides, i.e. a length of the compacting space.

The anvil thus forms, together with the lateral slides, a jaw-like unit in respect of displacement in a direction transverse to the torsion axis. In particular, it is thus possible, with the anvil extended, for the volume of the compacting space for compacting the welding material to be uniformly reduced in the radial direction by virtue of the anvil being lowered. In the case of the lateral slide being additionally displaceable in the direction of the torsion axis, it is also possible to reduce a dimension of the compacting space in this direction, in order to achieve the most uniform possible reduction in the volume of the compacting space.

It goes without saying that it is also conceivable to have other variants in which the anvil is mounted, for example, in a pivotable manner or the lateral slides are fixed in relation to the sonotrode and the anvil can be displaced, in the interspace between the lateral slides, in the direction of the welding surface. These variants, however, may have the disadvantage that they involve comparatively high outlay in design terms and/or are difficult to handle in practice.

On account of the welding space being accessible in a space-saving manner, the device according to the invention, in particular all of the embodiments thereof described above, can advantageously be used in mobile welding apparatuses. The invention therefore also covers a mobile welding apparatus which has a device according to the invention.

Such apparatuses are connected to a separate supply unit preferably via a supply line, the separate supply unit preferably comprising a generator for supplying the welding apparatus with electric current or an air-pressure generator for supplying it with compressed air. The supply unit advantageously also comprises a control computer, wherein, for example, an operating panel, also with a screen, is formed on the mobile welding apparatus. In this case, the user can operate the supply unit directly on the mobile welding apparatus. The supply line preferably combines all the necessary connections between the supply unit and the mobile welding apparatus in a single line.

Such mobile welding apparatuses are particularly suitable for use with welding material which, for example, is already installed and/or fixed in some other way and is no longer able to be fed to a stationary welding apparatus. It is precisely in this area that the device supplied according to the invention for space-saving, efficient and durable ultrasonic welding proves to be particularly advantageous.

It is usually the case here that the supply unit is of stationary design, whereas the mobile welding apparatus can be moved largely freely. However, it is also conceivable for the supply unit to be provided on a mobile base, and therefore it can be moved closer to the operating region, in which the mobile welding apparatus can then be used to carry out welding at various locations.

Mobile welding apparatuses are understood to mean, for example, welding tongs or other designs which users can carry and guide up to the welding material. Also conceivable are designs which are retained, for example, on a weight-compensating suspension means and are only guided by the user. Furthermore, it is also possible to have a fastening device or a stand on the mobile welding apparatus, the fastening device or stand allowing the welding apparatus to be respectively temporarily fastened or propped up in an operating region during welding.

In order to be handled by a user, mobile welding apparatuses typically comprise handles formed on the outside of the housing. According to the invention, the compacting/welding space is arranged on the end side in a direction transverse to a longitudinal direction of the device or of the sonotrode. In the case of a mobile welding apparatus according to the invention, it is therefore preferred for a handle to be arranged in a front region, on an upper side of the apparatus, in a direction transverse to the longitudinal axis of the device. This allows reliable handling when the apparatus is moved up to the welding material by way of the front end side, largely in its longitudinal direction. It goes without saying that, depending on the position of the welding material, the apparatus can also be moved up to the welding material in other directions.

In addition, it is advantageous here for a further handle to be provided in a region at a rear longitudinal end of the apparatus. If the converter, which is arranged perpendicularly to the torsion/longitudinal axis, is oriented downward, it is possible for a housing casing of the converter to be designed advantageously as a gun-handle-like grip and thus to form a rear grip.

Further advantageous embodiments and combinations of features of the invention can be gathered from the following detailed description and claims below.

BRIEF DESCRIPTION OF THE DRAWINGS

In the drawings, which are used to explain the exemplary embodiment, schematically.

It is basically the case in the figures that like parts are provided with like designations.

DETAILED DESCRIPTION OF THE INVENTION

Figure 1:
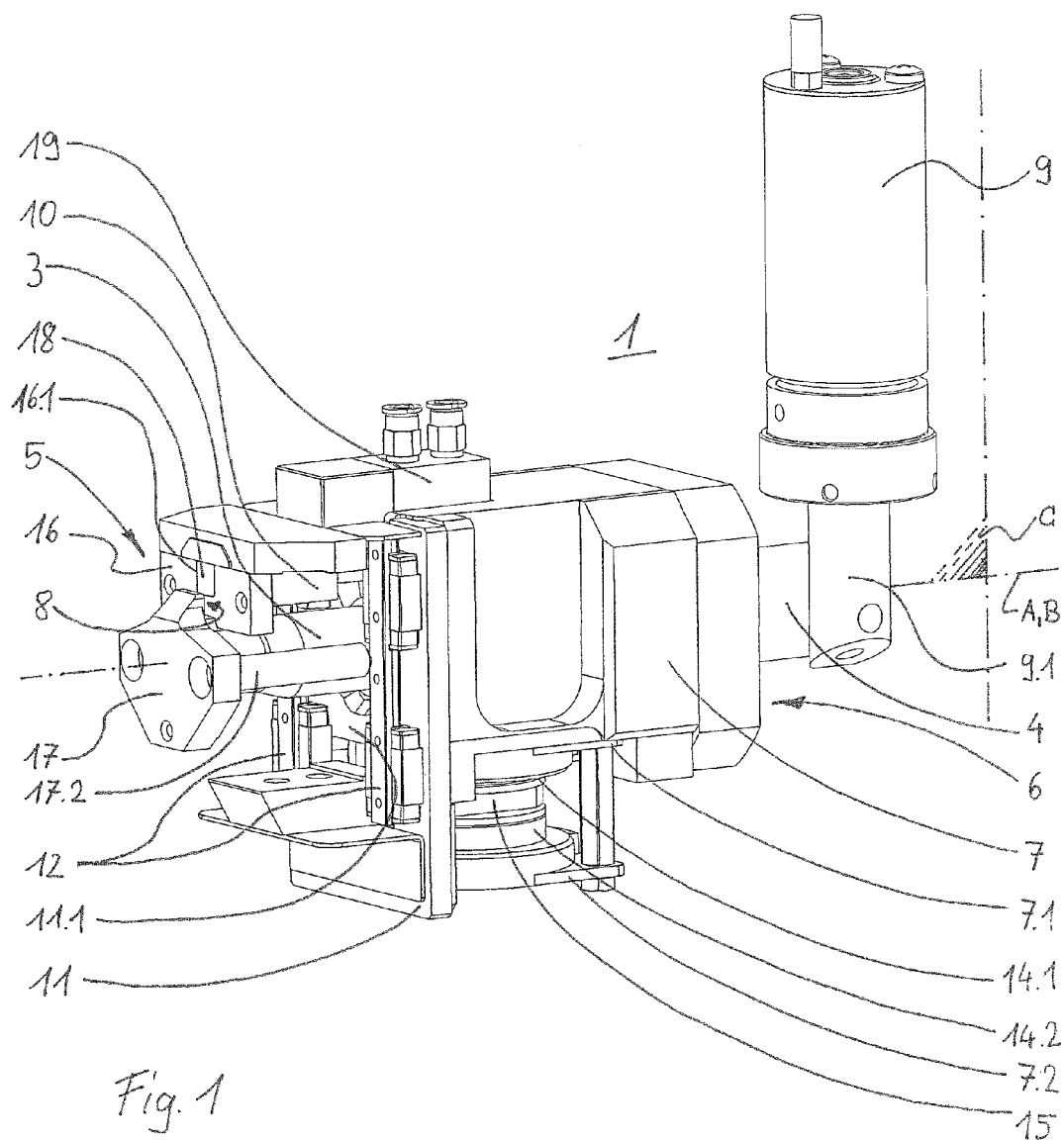
FIG. 1 shows an oblique view, in perspective, of a device according to the invention.

FIG. 1 shows an oblique view, in perspective, of a device 1 according to the invention.

The device 1 has, at a front longitudinal end 5, an operating region, at which a compacting or welding space 8 is formed. A vibration generator or converter 9 is arranged in an end region at a rear longitudinal end 6 of the device 1, and the activator 9.1 of the generator or converter is connected to a torsional vibrator 4 of the device 1. The converter 9 here is oriented perpendicularly to the torsion axis B.

A direction in which the converter 9 extends is referred to here, and herein below, by "upward" and, correspondingly, the opposite direction is referred to by "downward". It goes without saying that this assignment of terms is selected by way of example in accordance with the embodiment described here. It is, of course, also conceivable to have other embodiments, in which the converter 9 may be oriented, for example, "downward" or "to the side". A plane C therefore refers, herein below, to a vertical plane, which comprises the longitudinal axis A and the torsion axis B and is oriented in the upward/downward direction. The converter 9 is parallel, and laterally offset in relation, to said plane C.

Figure 4:
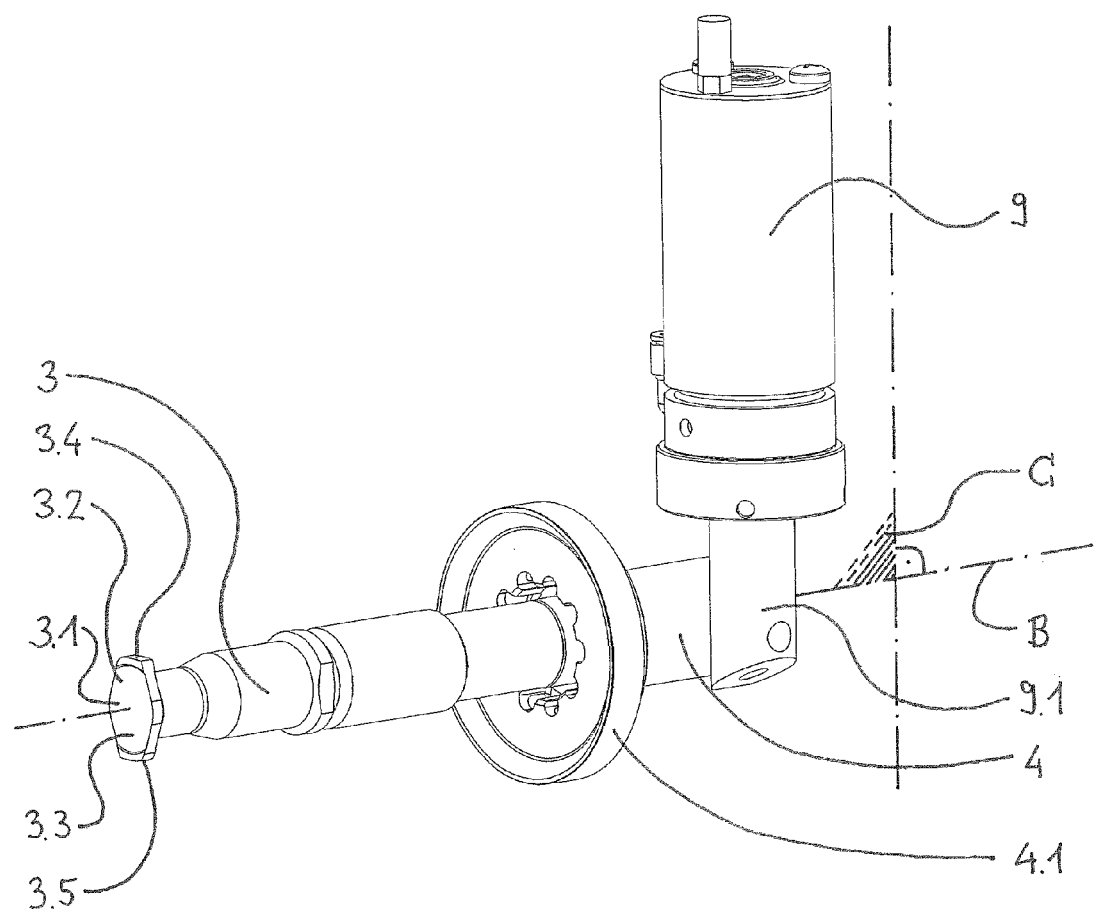
FIG. 4 shows the sonotrode and converter in an arrangement for the device according to the invention.

The torsional vibrator 4 is designed as an elongate axial body, of which the longitudinal axis coincides with a torsion axis B and corresponds to the longitudinal axis A of the device 1 (see also FIG. 4). The torsional vibrator 4 is arranged in, and mounted on, a carrier 7 of the device 1 (see FIG. 2, clamping ring 4.1). A rear longitudinal end of the torsional vibrator 4, this end being directed away from the operating region, projects beyond the carrier 7 in the longitudinal direction A. In an end region at the rear longitudinal end of the torsional vibrator, the activator 9.1 of the converter 9 is in contact tangentially with the torsional vibrator 4.

Provided at a front longitudinal end of the carrier 7, this end being directed toward the operating region, is a carrier plate 11 which is arranged perpendicularly to the longitudinal axis A and on the front side of which is arranged a longitudinal guide 12, which is provided in the upward/downward direction, perpendicularly to the longitudinal axis A and torsion axis B, and has two parallel rails which are symmetrical in relation to the plane C. Between the rails, the carrier plate 11 contains a through-passage 11.1 through which, fastened on the end side of the torsional vibrator 4, a sonotrode 3 projects forwards into the operating region.

Figure 2:
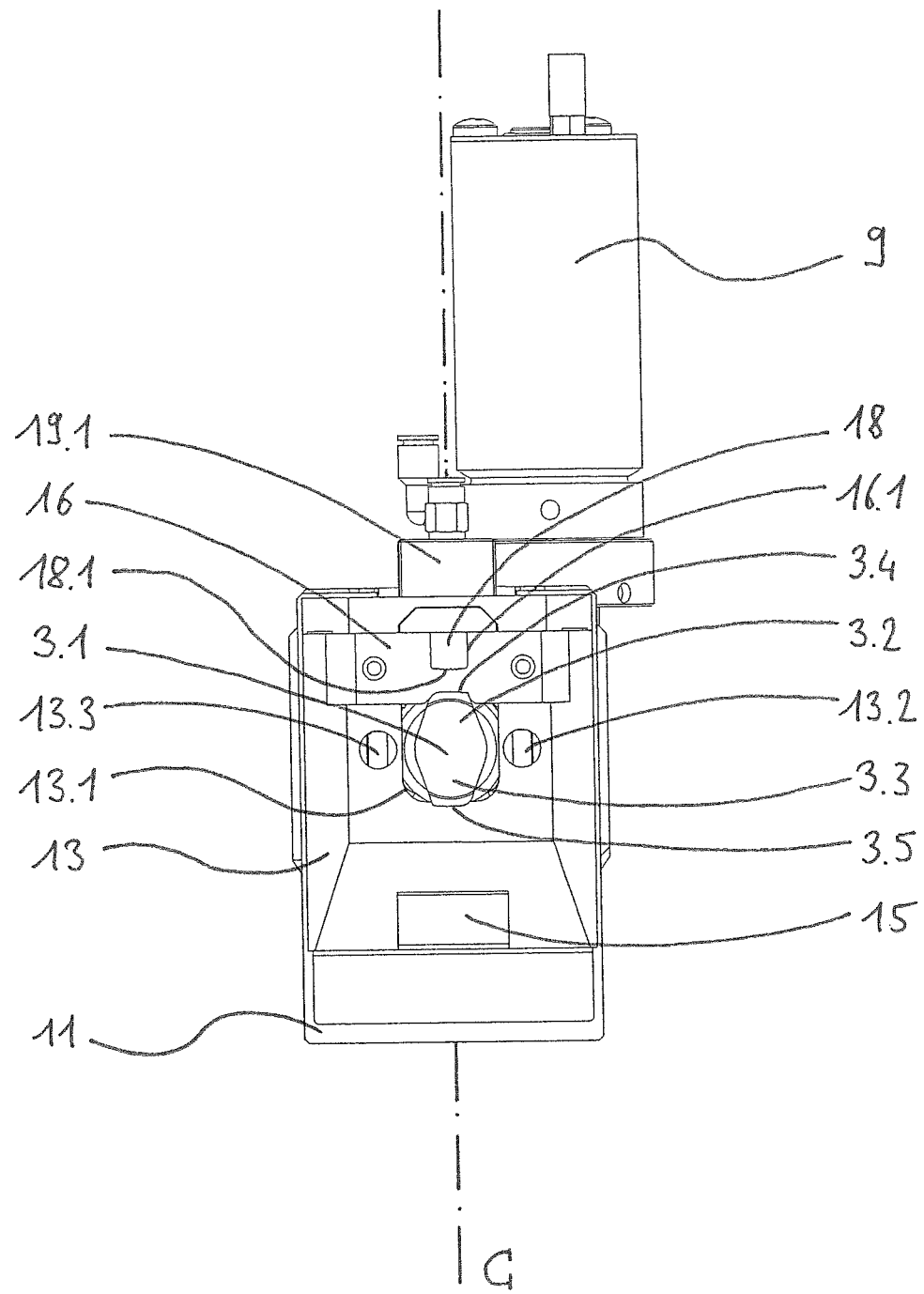
FIG. 2 shows a front view of an operating region of the device along a longitudinal axis.

A carriage 13 is mounted on the rails 12 such that it can be guided in a displaceable manner in a direction perpendicular to the torsion axis B (the carriage not being illustrated in FIG. 1; see, for example, FIG. 2). On an underside of the carrier 7, two linearly acting activators 14.1 and 14.2 are arranged perpendicularly to the longitudinal axis A and are supported on the carrier 7 via carrier elements 7.1 and 7.2. The activators 14.1 and 14.2 can each expand in their longitudinal direction, (e.g. by being subjected to the action of compressed air) and can thus each exert a force in a direction perpendicular to the longitudinal axis A. Arranged between the activators 14.1 and 14.2 is a driver element 15, which projects forward through the aperture 11.1 in the carrier plate 11 and engages with coupling action in the carriage 13. If the upper activator 14.1, which is arranged closer to the carrier 7, is actuated, this results in the driver element 15 being subjected to a downward force, as a result of which the carriage 13 is also displaced downward. Conversely, the carriage 13 is subjected to an upward force via the driver element 15 if the lower activator 14.2 is actuated.

The carriage 13 here has an aperture 13.1, through which the sonotrode 3 can pass without obstruction in any displacement position of the carriage 13 (see FIG. 2). A head 3.1 of the sonotrode 3 is arranged in front of the carriage 13, as seen in the longitudinal direction. The carriage 13 has arranged on it, above the sonotrode 3, an inner lateral slide 16, which has a through-passage 16.1 in the longitudinal direction A directly above the sonotrode head 13.1. The through-passage 16.1 contains an anvil 18 which, guided in a longitudinal guide 10, can be extended and retracted through the through-passage 16.1 via an actuator 19, which acts in the longitudinal direction A. On a side which is directed toward the sonotrode head 3.1, the anvil 18 has an abutment surface or compacting surface 18.1. Both the actuator 19 and the longitudinal guide 10, as well as the anvil 18, are mounted on the carriage 13 and are also displaced when the carriage 13 is displaced.

Likewise mounted on the carriage 13 is an outer lateral slide 17, which is fastened on the carriage 13 via two carrying bolts 17.1 and 17.2, which project in the direction of the carrier 7. The outer lateral slide 17 here is arranged in front of the sonotrode head 3.1, as seen in the longitudinal direction A, and is spaced apart from the inner lateral slide 16 in the longitudinal direction 1. The outer lateral slide 17 fully covers over the sonotrode head 3.1 on the end side.

The sonotrode head 3.1 has two wings 3.2 and 3.3, which protrude in a flange-like manner and extend upward (3.2) and downward (3.3). The upwardly projecting wing 3.2 here is arranged between the outer lateral slide 17 and the inner lateral slide 16, wherein a welding surface 3.4 is formed circumferentially on an upper side of the wing 3.2. Along with the welding surface 3.4 of the sonotrode head 3.1, regions of the mutually facing inner surfaces of the lateral slides 16 and 17 which are arranged by the welding surface 3.4 delimit three sides of the compacting space 8. The anvil 18 is arranged in a displaceable manner on the inner lateral slide 16 such that, in the extended state, it is adjacent to the outer lateral slide 17, wherein the compacting surface 18.1 is located opposite the welding surface 3.4 of the sonotrode 3. With the anvil 18 extended, the compacting space 8 is thus annularly enclosed in the plane C. In the direction perpendicular to the plane C, the compacting space 8 is open on either side, and therefore welding material can pass transversely through the compacting space 8.

FIG. 2 shows a front view of the operating region 5 of the device 1 along the longitudinal axis A. For the sake of priority, the illustration does not include the outer lateral slide 17, in order to give a free view of the sonotrode head 13.1.

The sonotrode head 13.1 is of largely lozenge-shaped design in plan view, this giving rise to the upwardly and downwardly projecting wings 3.2 and 3.3, respectively. The sonotrode head 3.1 is designed symmetrically in relation to the torsion axis B, and this therefore avoids any unbalance in relation to torsional vibration.

An upper end of the sonotrode head 3.1, i.e. the upwardly projecting wing 3.2, is flattened (cropped lozenge shape) and formed into the welding surface 3.4, which is arranged circumferentially in relation to the torsion axis B. The downwardly projecting wing 3.3 is flattened correspondingly, wherein, depending on the embodiment of the device 1, a second (replacement) welding surface 3.5 may be formed. In the arrangement illustrated, this latter welding surface is not in a functional position, but, for example in the case of the sonotrode 3 being fitted in a rotatable manner on the torsional vibrator 4, can be rotated into the position of the welding surface 3.4. This may be expedient, in particular, when the welding surfaces are subjected to rapid wear and have to be exchanged.

Above the welding surface 3.4, the inner lateral slide 16 is designed as a crossbar-like element arranged largely perpendicularly to the plane C. The lateral slide 16 here is fastened in a groove which is formed correspondingly on the carriage 13. The anvil 18, arranged in the longitudinal guide 10, can be seen on the lateral slide 16, through the through-passage 16.1. The abutment or compacting surface 18.1 is formed on an underside of the anvil 18, said underside being directed toward the welding surface 3.4.

Two further apertures 13.2 and 13.3 are formed on the carriage 13 level with the torsion axis B or the longitudinal axis A of the device 1, these further apertures being provided for accommodating, and retaining, the carrying bolts 17.1 and 17.2 of the outer lateral slide 17.

FIG. 2 further shows the converter 9 being arranged laterally, in a manner in which it is offset in relation to the plane C and which allows the activator 9.1 to be in tangential contact with the torsional vibrator 4 in order to excite the torsional vibration.

Figure 3A:
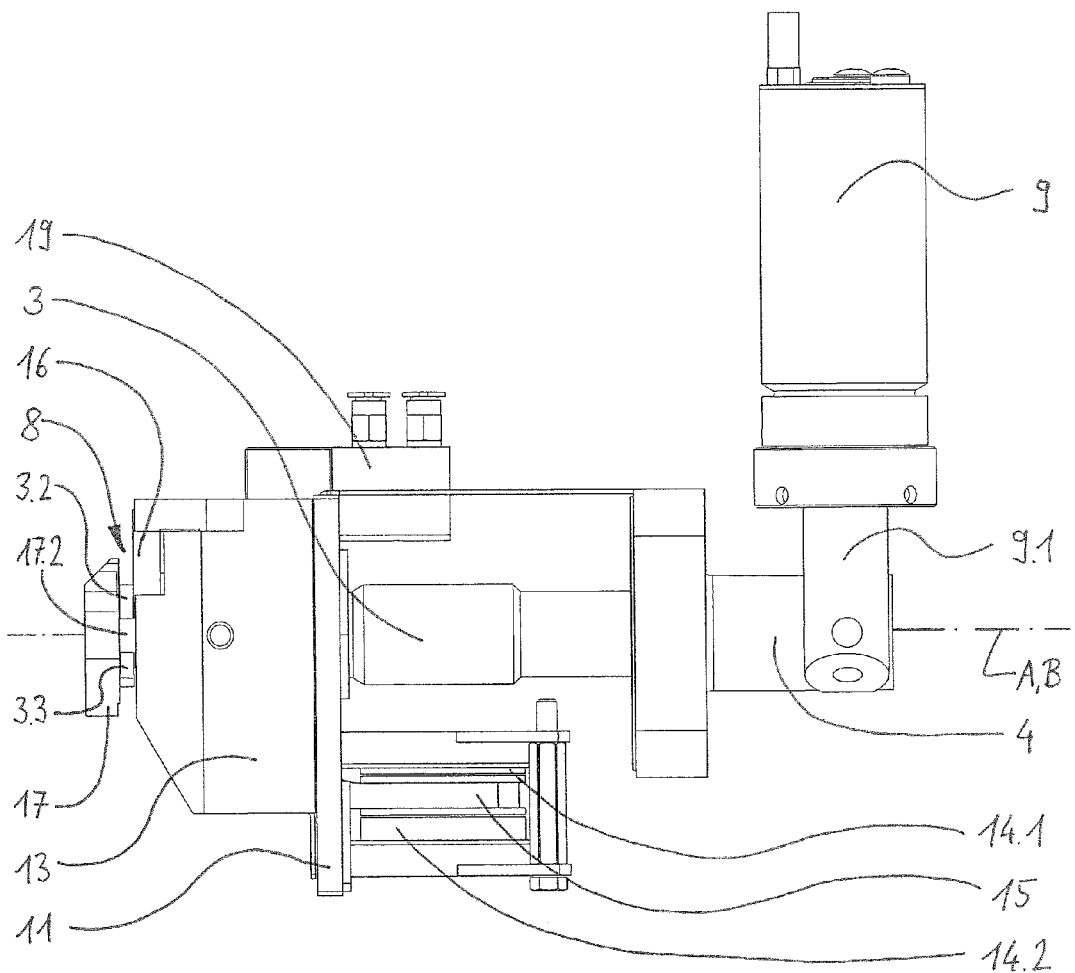
FIG. 3a shows a side view of the device in a standby position.

FIG. 3a shows a side view of the device 1, wherein, for the sake of clarity, the carrier 7 has been omitted from the illustration.

The illustration of FIG. 3a shows the device 1 in a standby state. The lower actuator 14.2 has been expanded and the upper actuator 14.1 has been collapsed, and therefore the driver element 15, arranged therebetween, has been displaced upward. The coupling to the carriage 13 means that the latter has been carried along by the driver element 15 and has likewise been displaced upward.

The anvil 18 is fully retracted into the through-passage 16.1, and therefore an end surface of the anvil 18 terminates with the inner surface of the inner lateral slide 16, said inner surface being directed toward the outer lateral slide 17. The compacting space 8 is thus open in the upward direction, as a result of which welding material, for example strands or other cables, can be introduced into the compacting space 8 and arranged on the welding surface 3.4 of the sonotrode 3.

Figure 3B:
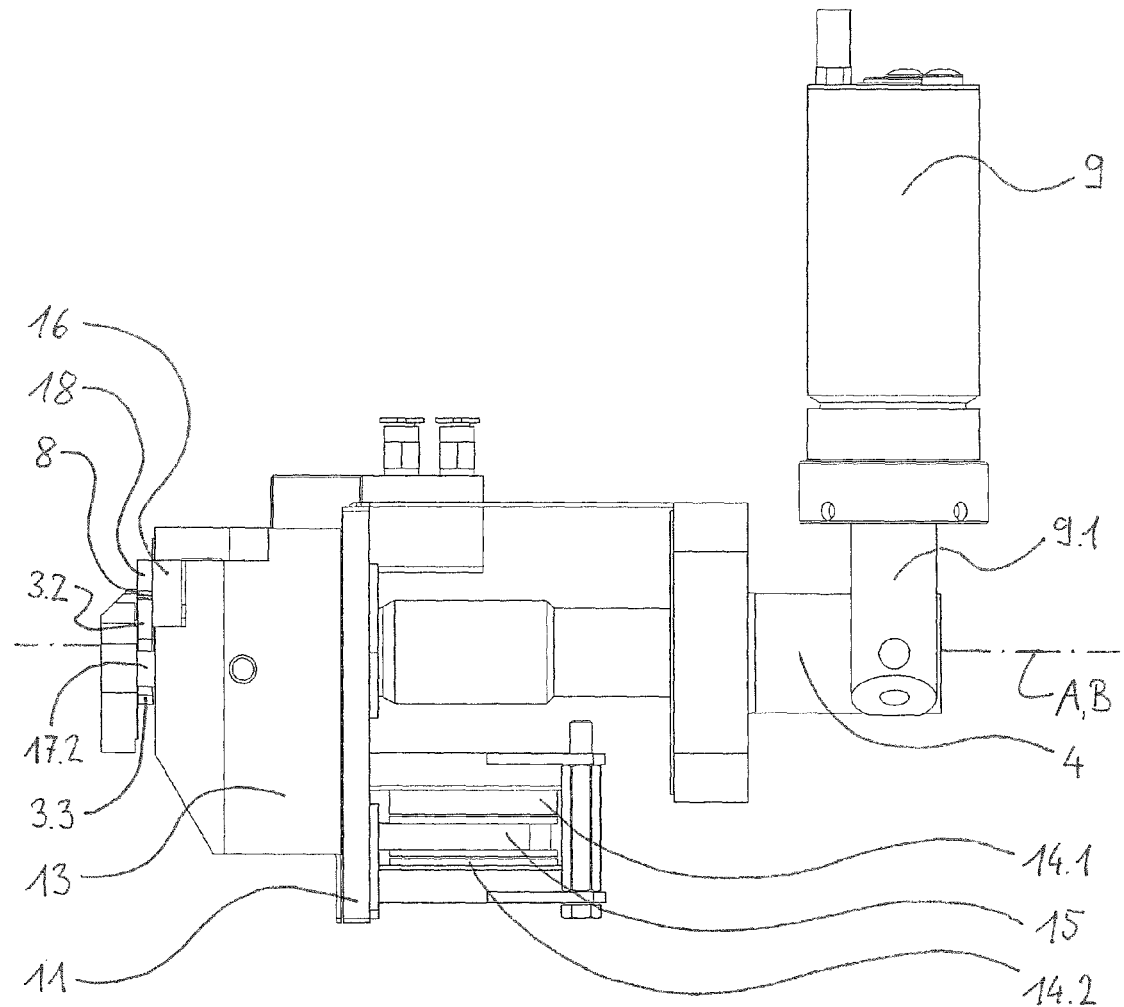
FIG. 3b shows a side view of the device in a compacting/welding position.

FIG. 3b corresponds to the illustration of FIG. 3a, although the device 1 is in a compacting/welding position.

The anvil 18 has been extended forward, out of the through-passage, in the longitudinal direction A, and therefore its end side strikes against an inner surface of the outer lateral slide 17, said inner surface being directed toward the inner lateral slide 16. The compacting surface 18.1 of the anvil 18 is arranged opposite the welding surface of the sonotrode head 3.4. The compacting space 8 is thus fully closed off in the upward direction by the anvil 18.

In the welding position, in addition, the carriage 13 has been displaced downward. This is achieved by the upper actuator 14.1 having been expanded and the lower actuator 14.2 having been collapsed. The driver element 15 is thus moved downward, away from the carrier 7, and carries along the carriage 13, which is displaced downward in the longitudinal guide 12.

Together with the carriage 13, it is also the case that the lateral slides 16, 17, fitted thereon, and the anvil 18 (as well as the actuator 19 and longitudinal guide 10) are lowered downward in relation to the carrier 7. The sonotrode 3, mounted on the carrier 7, and the torsional vibrator 4 remain in a fixed location in relation to the carrier 7. This gives rise to the carriage 13, with components fitted thereon, being displaced relative to the sonotrode 3.

The lateral slides 16 and 17 and anvil 18 here form a U-shaped compacting jaw, which at least partially encloses the sonotrode head 3.1 and is displaced in relation to the same during transfer into the welding position. The sonotrode head 3.1, or the wing 3.2 of the sonotrode head 3.1, enters into the interior space enclosed by the U shape. The interior space of the U shape and the wing 3.2 of the sonotrode head 3.1 are dimensioned here such that the wing 3.2 virtually completely fills the interior space in the longitudinal direction A. It goes without saying that a tolerance which allows for free torsional vibration of the sonotrode head 3.1 is provided here.

During transfer into the welding position, in particular also the compacting surface 18.1 of the anvil 18 is displaced in the direction of the welding surface 3.4. The welding material (not illustrated), which is present in the compacting space 8, is compacted between the compacting surface 18.1 and welding surface 3.4 and, depending on the force exerted by the actuator 14.2, pressed against the welding surface 3.4. The torsional vibration of the sonotrode 3 can thus be introduced into the welding material via the welding surface 3.4 of the sonotrode head 3.1. The welding material is preferably compacted by a first force prior to the excitation of the torsional vibration in the sonotrode 3. When the welding operation is initiated, i.e. when the torsional vibration of the sonotrode is excited, the welding material may thus continue to be subjected to the action of the first force or be subjected to the action of a second, e.g. greater force.

For removal of the welding material, the device 1 is moved back into the standby state, i.e. the carriage 13 is displaced upward again and the anvil 18 is retracted, as a result of which the compacting space is open once again in the upward direction.

FIG. 4 shows the sonotrode 3, the torsional vibrator 4 and the converter 9 in an arrangement for the device according to the invention.

A front end side of the sonotrode 3 is terminated by the sonotrode head 3.1. Along the torsion axis B or longitudinal axis of the sonotrode 3, the sonotrode extends rearward to a region 3.6, in which it is connected to the torsional vibrator 4. The torsional vibrator 4 here is designed as an elongate axial body, of which the longitudinal axis coincides with the longitudinal axis of the sonotrode 3 and with the torsion axis B.

The torsional vibrator 4, at a longitudinal position behind the sonotrode 3, is enclosed by the clamping ring 4.1, which forms a bearing for the torsional vibrator, at which the torsional vibrator is supported on the carrier 7. The clamping ring 4.1 here is typically arranged in a vibration node of the excited torsional-vibration mode, in order to avoid transmission of vibrations to the carrier 7 and thus also to other components of the device 1.

Behind the clamping ring 4.1, i.e. at a longitudinal position of the torsional vibrator 4 which is located opposite the sonotrode 3, as seen in relation to the clamping ring 4.1, the actuator 9.1 of the laterally offset converter 9 is in contact with the torsional vibrator 4 tangentially to a circumference of the torsional vibrator 4 and perpendicularly to the longitudinal axis or to the torsion axis B.

Figure 5:
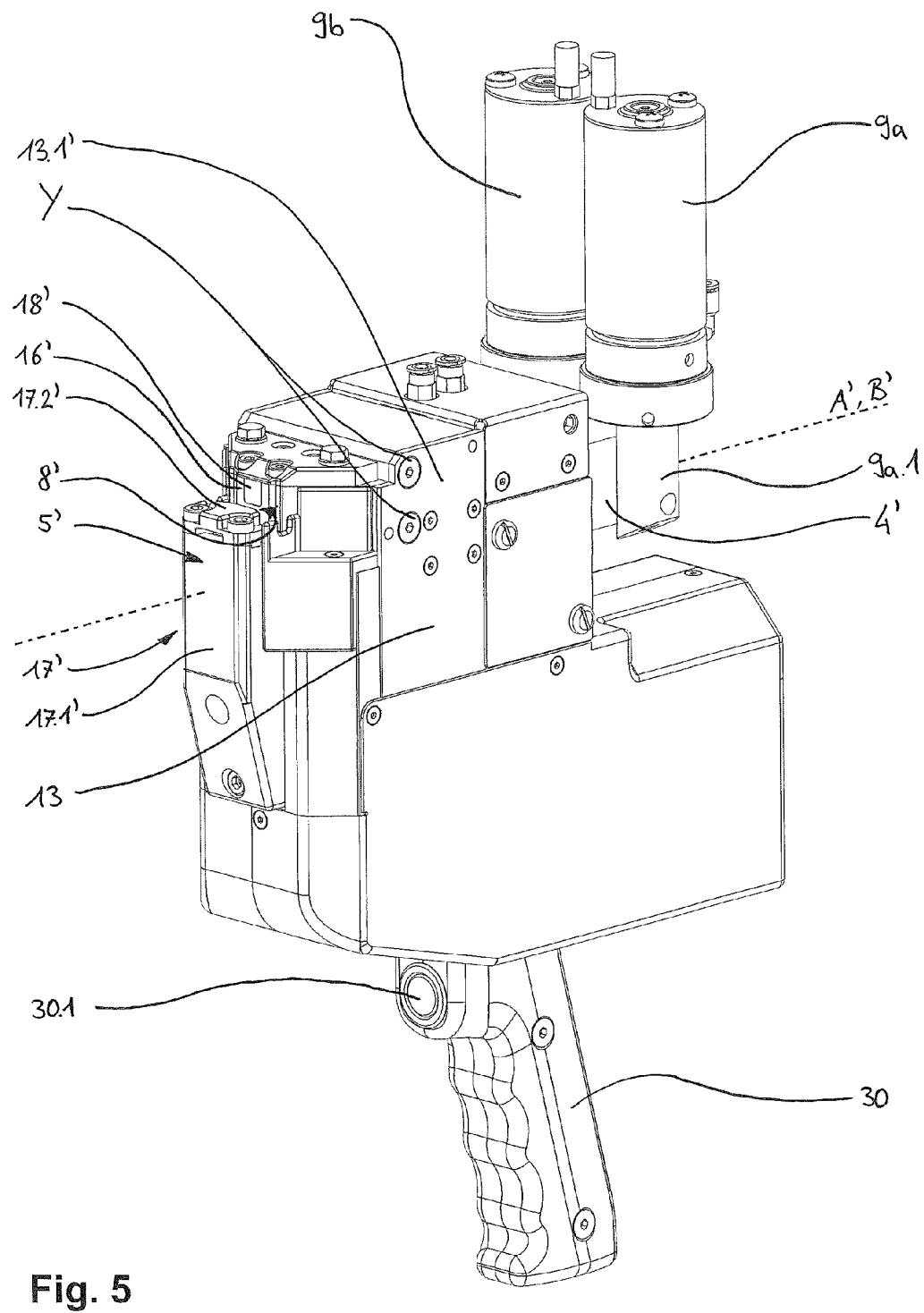
FIG. 5 shows an oblique view, in perspective, of a further embodiment of a device according to the invention.

FIG. 5 shows a further embodiment of the device 1' according to the invention. In a manner similar to the device 1, a compacting or welding space 8' is formed at a front longitudinal end 5'. Two converters 9a and 9b are present at a rear longitudinal end 6', each being in contact, on opposite sides, with an axial-body-design torsional vibrator 4' and by way of an activator 9a.1 and 9b.1. The converters 9a and 9b here are arranged perpendicularly to a torsion axis B', which is defined by the torsional vibrator 4'. A longitudinal axis A' of the device 1' coincides here with the torsion axis B'.

A sonotrode 3' (not visible in FIG. 5; see, for example, FIG. 6) is fastened on the torsional vibrator 4' in the direction of the front longitudinal end 5'. A sonotrode head 3.1' of the sonotrode 3' is arranged in the longitudinal region of the compacting space 8' and delimits the latter radially, in the direction of the torsion axis B', by way of a lateral welding surface 3.4'.

A gun-like handle 30 is formed on an underside of the device 1' and allows a user to hold the device 1'. The handle 30 has an actuating element 30.1, by means of which a welding operation can be initiated.

The compacting space 8' is delimited on the end side by an outer lateral slide 17.2', which is part of a lateral-slide unit 17' (see FIG. 7), which is mounted in the device 1' such that it can be displaced in the direction B'. The lateral-slide unit 17', furthermore, comprises a slide carrier 17.1', to which the outer lateral slide 17.2' is fixed. The slide carrier 17.1' is arranged in front of the sonotrode head 3.1', as seen in the direction of the torsion axis B', and extends in the direction perpendicular to B'.

The compacting space 8' is delimited on the inside in relation to B', i.e. in the direction of the longitudinal end 6', by an inner lateral slide 16', on which an anvil 18' is mounted such that it can be displaced in the direction B'.

Figure 6:
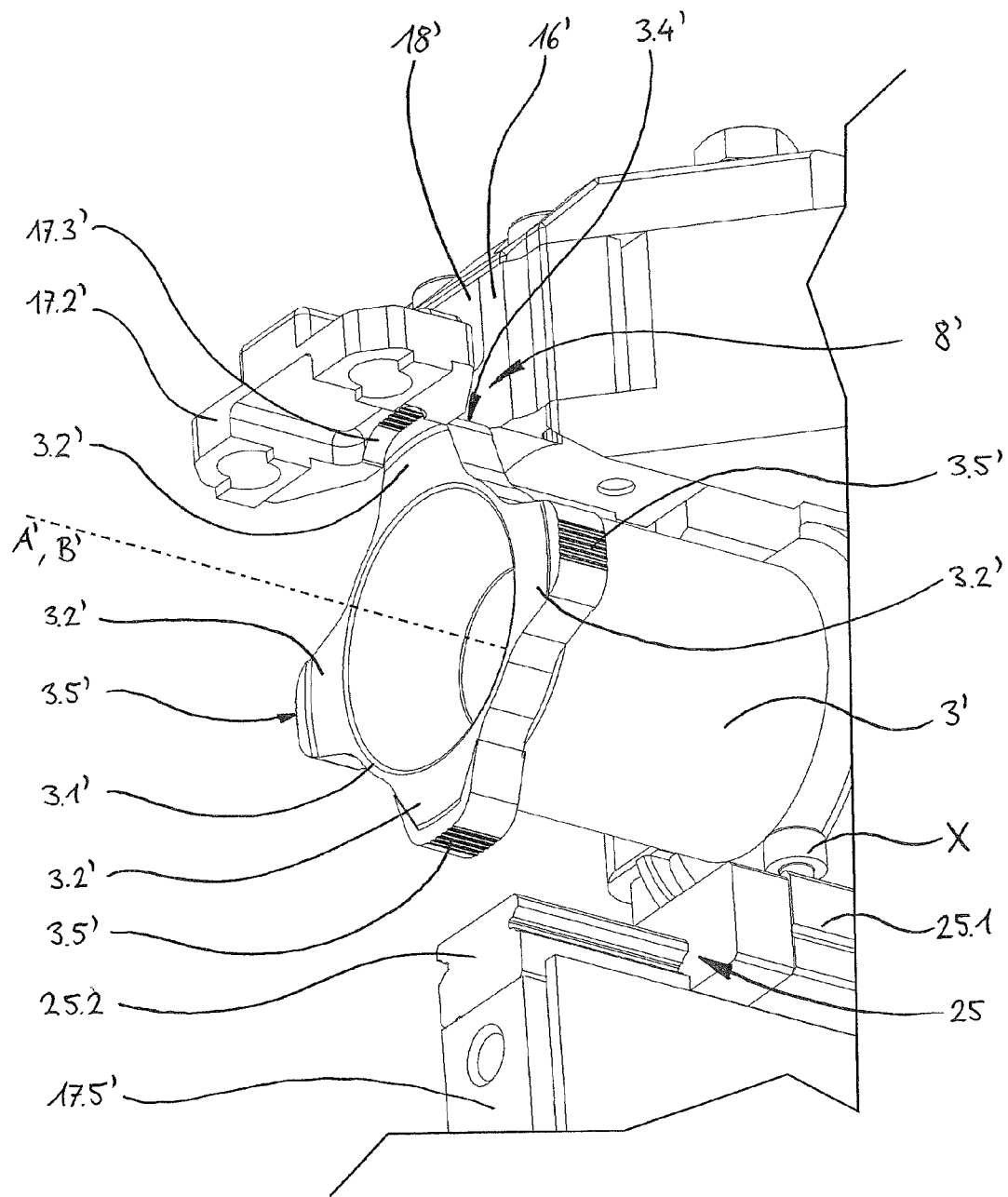
FIG. 6 shows a partial outer view of a sonotrode head with an outer lateral slide of the device from FIG. 5.

FIG. 6 shows a partial view of the device 1' in the region of the sonotrode head 3.1', wherein, for the sake of clarity, the slide carrier 17.1' has not been included in the illustration. The sonotrode head 3.1' has four wings 3.2' protruding radially in a flange-like manner. The wings 3.2' here are arranged in a crosswise manner at right angles in relation to one another. The welding surface 3.4' which delimits the compacting space 8' is formed laterally on an upwardly projecting wing 3.2' which is directed toward the compacting space 8'. The welding surface 3.4' here has channels which are oriented parallel to the torsion axis B and ensure good transmission of the sonotrode vibrations to the welding material compacted in a compacting space 8'. The rest of the wings 3.2 each bear an identical welding surface 3.5'. Depending on the rotary position of the sonotrode 3' on the torsional vibrator 4', it is optionally possible for any of the welding surfaces 3.5' to be assigned to the compacting space 8'.

The inner lateral slide 16' is arranged behind the welding surface 3.4', as seen in the direction of the torsion axis B', and delimits the compacting space 8' in the rearward direction. The outer lateral slide 17.1' is arranged opposite the inner lateral slide 16', as seen in the direction B'. The lateral slide 17.1' has an aperture 17.3' which, as seen in the direction of the torsion axis B', corresponds to a projection of the wing 3.2' which bears the welding surface 3.4'-wing 3.2' with welding surface 3.4' is thus essentially aligned with the aperture 17.3'.

The aperture 17.3' allows the lateral slide 17.2' to be displaced in the direction of the lateral slide 16' for the purpose of compacting the welding material in the compacting space 8', in the direction of the torsion axis B' via the welding surface 3.4'. The aperture 17.3' here is dimensioned such that there is sufficient space for the torsional vibration of the sonotrode 3' if the wing 3.2' with the welding surface 3.4' is arranged, at least in part, in the aperture 17.3'. The aperture 17.3', in addition, has longitudinal ribbing which complements the welding surface 3.4'. The small vibration amplitudes thus make it possible for the lateral slide 17.2' to extend comparatively closely to, with just a small gap from, the welding surface 3.4'. As can be seen from (the bottom of) FIG. 7, the lateral slide 17.2' is connected rigidly, via the slide carrier 17.1', to a slide carriage 17.5', which is mounted on a displacement guide 25 of the device 1', beneath the sonotrode 3'. The displacement guide 25 here comprises device-mounted guide elements 25.1, on which a rail 25.2, which is fixed to the slide carriage 17.5', is mounted such that it can be guided in a displaceable manner in the direction of the torsion axis B', or in the present case also in the longitudinal direction A'. The slide carrier 17.1', which is not illustrated in FIG. 6, extends from the slide carriage 17.5' in the direction of the lateral slide 17.2', in doing so spanning the sonotrode head 3.1' on the end side (see FIG. 7).

Figure 7:
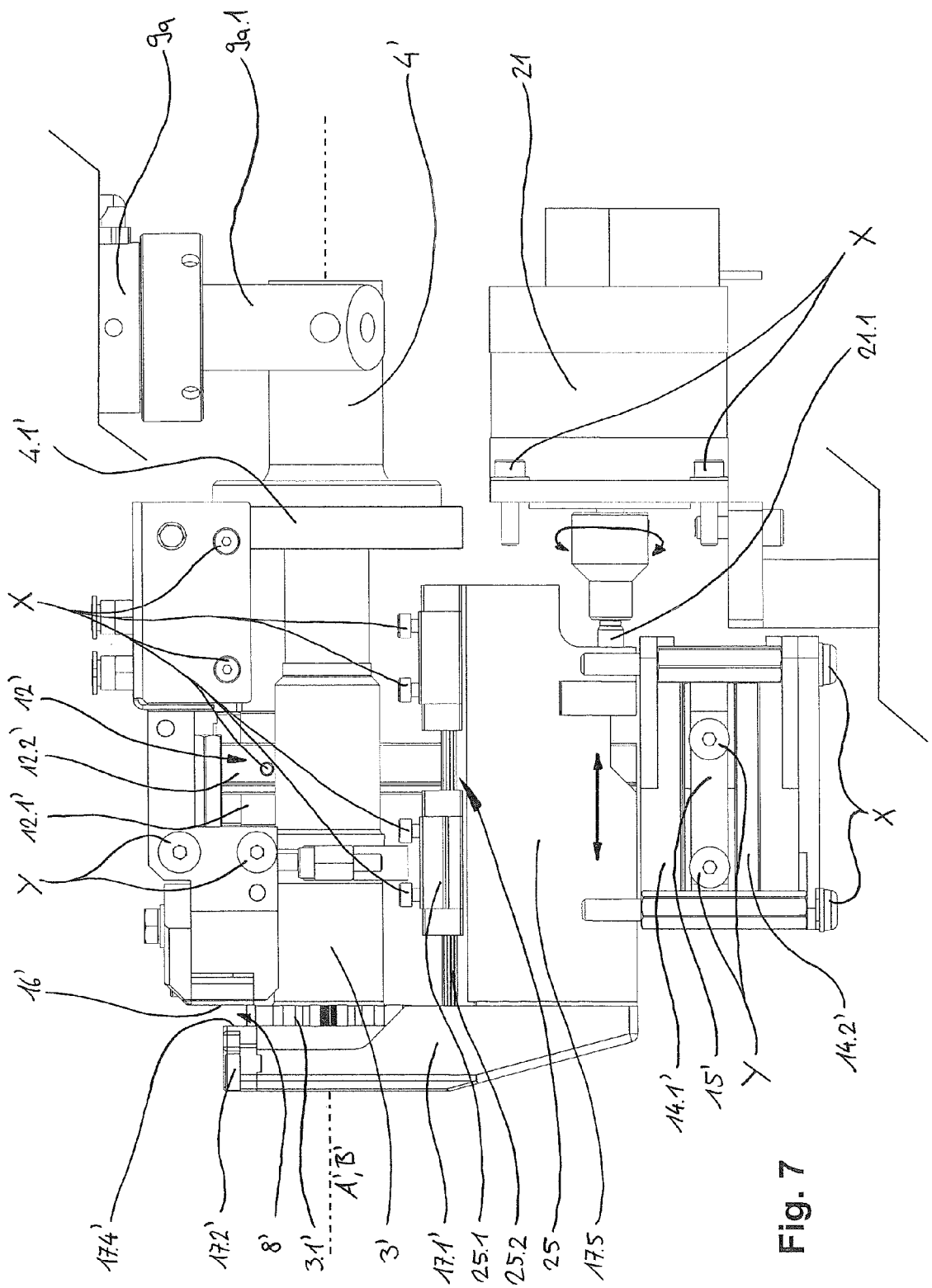
FIG. 7 shows a partial side view of the device according to FIG. 5.

FIG. 7 shows the device 1' in a side view in which some concealing elements have been removed. For reasons of clarity, FIG. 7 does not illustrate a central carrier body of the device 1', the components of the device 1' such as, for example, the torsional vibrator 4' being fastened and/or mounted on said carrier body directly or indirectly via a clamping ring 4.1'. Screws designated by X serve for anchoring the corresponding component on the carrier body. Such components anchored on the carrier body are also referred to as being "device-mounted".

The guide elements 25.1, which are arranged largely beneath the sonotrode 3', as seen in relation to B', are anchored on the carrier body via the screws X. The guide rail 25.2 is mounted in the guide elements 25.1 such that it can be displaced in the direction of the torsion axis B'. The slide carriage 17.5' is fastened rigidly on the rail 25.3. A motor 21 is mounted on the device via screws X essentially behind the slide carriage 17.5', as seen in direction B'. Via a spindle 21.1, the slide carriage 17.5' can be displaced in the displacement guide, in direction B', by the motor 21.

The slide carrier 17.1' is fastened rigidly on the end side of the slide carriage 17.5'. In front of the sonotrode head 3.1', as seen in direction B', the slide carrier 17.1' extends into a region by the compacting space 8', where the outer lateral slide 17.2' is fastened rigidly on the slide carrier 17.1'. It is thus possible for the motor 21 to displace the lateral slide 17.2' in direction B' toward the inner lateral slide 16' or away from the same. It is therefore possible for a longitudinal dimension of the compacting space 8' to be reduced for compacting purposes (or increased for the purpose of freeing the welding material).

The anvil 18' is designed such that, in the extended state, it follows a displacement of the lateral slide 17.2'. This ensures that, during the compacting operation, the compacting space 8' is closed off fully in the radially outward direction in any displacement position of the lateral slide 17.2'.

The lateral slide 16' is mounted on a carriage 13' such that it can be displaced in a direction perpendicular to the torsion axis B', and therefore it can be displaced radially in the direction of the torsion axis B' or away from the same. Actuators 14.1' and 14.2' for displacing the carriage 13' are arranged beneath the sonotrode 3' (i.e. largely opposite the lateral slide 16', as seen in relation to B') and are fixed to the carrier body by screws X.

In contrast to the end-side longitudinal guide 12 of the device 1 for the carriage 13, the functionally largely corresponding longitudinal guide 12' for guiding the carriage 13' is arranged on either side of the sonotrode 3', as seen in relation to B'. The carriage 13' comprises, on either side, an outer plate 13.1', which operatively connects the lateral slide 16', via screws Y, to a driver element 15' arranged between the actuators 14.1' and 14.2'. The plates 13.1' are each fastened rigidly on runners 12.1' of the longitudinal guide 12'. The runners 12.1' are guided in a displaceable manner on guide rails 12.2', which are arranged perpendicularly to B' and are mounted on the device via screws X (in FIG. 7, elements of the longitudinal guide 12' are illustrated only on the side which is hidden from view).

During the compacting operation, the actuators 14.1' and 14.2' act on the driver element 15' such that the carriage 13', and thus also the lateral slide 16', is displaced downward in the direction of the sonotrode 3'. A compacting surface 18.1' of the extended anvil 18' is moved here in the direction of the welding surface 3.4'. The inner lateral slide 16' and the anvil 18', which is mounted thereon, thus essentially corresponding, in functional terms, to the corresponding elements of the device 1.

Figure 8A:
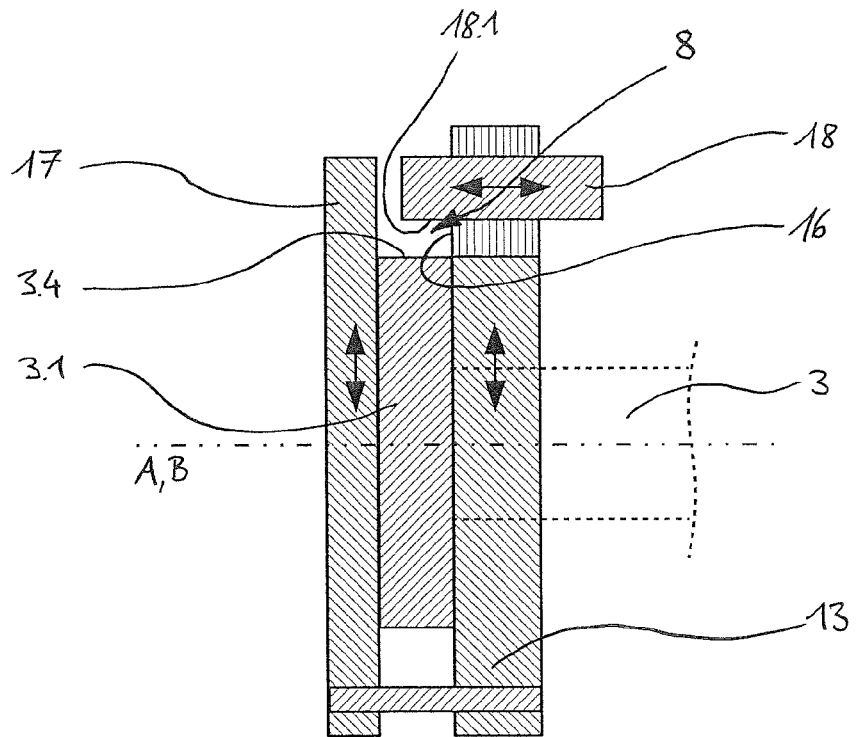
FIG. 8a shows a schematic diagram of the compacting space of the device according to FIG. 1.
Figure 8B:
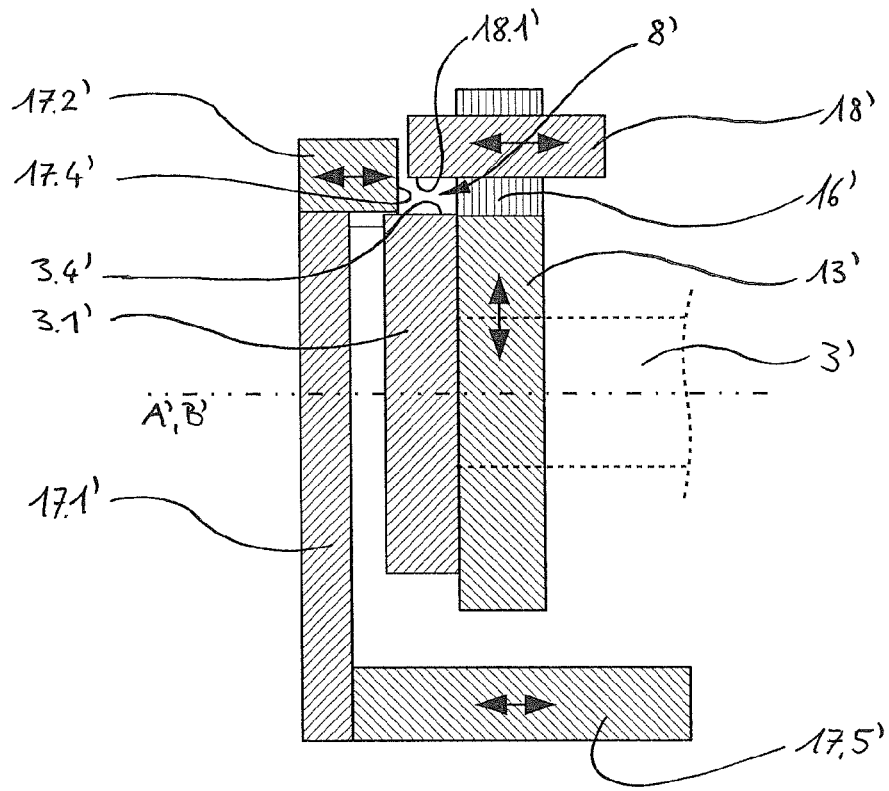
FIG. 8b shows a schematic diagram of the compacting space of the device according to FIG. 5.

FIGS. 8*a* and 8*b* show a schematic sectional view of the compacting space 8 or 8', respectively, of the devices 1 and 1', respectively.

FIG. 8*a* shows the compacting space 8 of the device 1. The compacting space 8 is delimited by the lateral slides 16 and 17 in the direction of the torsion axis B. Said slides are spaced apart from one another, in the direction of B, in a fixed longitudinal position such that there is just enough space for the sonotrode head 3.1 in between. The two lateral slides 16 and 17 are arranged rigidly on the carriage 13, which can be displaced relative to the sonotrode head 3.1 in a direction perpendicular to B. During the compacting operation, the two lateral slides 16 and 17, at a fixed longitudinal distance apart, are jointly lowered in the direction of the torsion axis B, wherein the extended anvil 18 is lowered, by way of its compacting surface 18.1, onto the welding surface 3.4. During the compacting operation, there is therefore a reduction only in the dimension of the compacting space 8 in a direction perpendicular to B. A longitudinal dimension in the direction of B is predetermined by the sonotrode head 3.1.

FIG. 8*b* shows the compacting space 8' of the device 1'. The compacting space 8' is delimited by the lateral slides 16' and 17.2' in the direction of the torsion axis B. Whereas the lateral slide 16' is arranged in the fixed longitudinal position, as seen in the direction of B', adjacent to the welding surface 3.4' of the sonotrode head 3.1', the lateral slide 17.2' can be displaced in the direction of B', above the welding surface 3.4', toward the lateral slide 16'. The lateral slide 16' here is arranged rigidly on the carriage 13', which can be displaced relative to the sonotrode head 3.1' in a direction perpendicular to B'. During the compacting operation, the lateral slide 16' is lowered in the direction of the torsion axis B', wherein the extended anvil 18', which is mounted on the lateral slide 16, is lowered, by way of its compacting surface 18.1', onto the welding surface 3.4'. During the compacting operation, in addition, the lateral slide 17.2' is displaced in the direction of the lateral slide 16'. This can take place at the same time as, or sequentially in relation to, the operation of lowering the lateral slide 16'. The anvil 18' here is displaced along in the direction B' and can thus close off the compacting space 8' fully in the upward direction. During the compacting operation, there is therefore a reduction in the dimension of the compacting space 8' both in a direction perpendicular to B' and in the direction of B', in particular irrespective of a corresponding dimension of the sonotrode head 3.1'.

Figure 9:
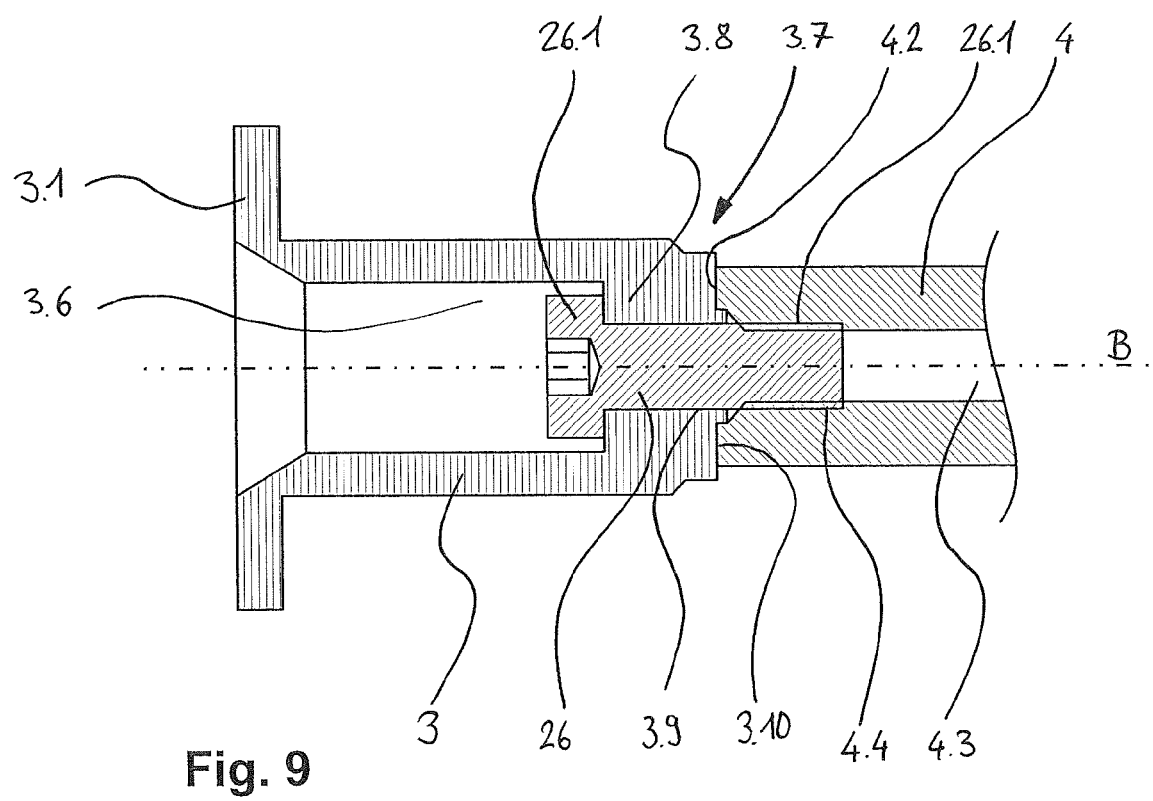
FIG. 9 shows a partial sectional view of a sonotrode fastening on the torsional vibrator.

FIG. 9 shows, schematically, a partial cross-sectional view along the torsion axis B (or B') through the sonotrode 3 (or 3') and the torsional vibrator 4 (or 4').

The sonotrode 3 here from the direction of the sonotrode head 3.1, has a countersunk hole 3.6, which extends in the direction B essentially over the entire length of the sonotrode 3. At a fastening end 3.7 of the sonotrode 3, the countersunk hole 3.6 is terminated by a floor 3.8. The floor 3.8 contains a continuous bore 3.9, which runs in direction B and is open on an end-side fastening surface 3.10.

The sonotrode 3 butts, by way of the fastening surface 3.10, against a complementary fastening surface 4.2 on the torsional vibrator 4. The torsional vibrator 4 has an internal thread 4.4 in an inner bore 4.3.

The sonotrode 3 is fastened on the torsional vibrator 4 by way of a screw 26, which is arranged in the countersunk hole 3.6. The screw 26 extends through the bore 3.9 and is screwed into the internal thread 4.4 by way of an external thread 26.1. A screw head 26.2 here is supported on the floor 3.8 of the countersunk hole 3.6. This gives rise to a particularly straightforward, front-access means of fastening the sonotrode 3 on the torsional vibrator 4 or, possibly, directly on a converter, wherein the sonotrode 3 can be straightforwardly aligned in respect of rotation about B and can then be fixed in this position.

What is claimed is:

1. A device for welding metal parts by means of ultrasound, the device comprising:
   a sonotrode with a sonotrode head, which can be excited by a vibration generator to perform vibrations, wherein
   the vibration generator, for generating the vibrations, interacts with the sonotrode via a vibrator, which is vibrationally coupled to the sonotrode,
   the sonotrode is connected to the vibrator with a screw connection,
   the sonotrode has, in a longitudinal direction, a central countersunk hole which is accessible from the sonotrode head and, in a direction of a fastening end side, has a longitudinally continuous bore on a floor of the countersunk hole, the fastening screw is screwed longitudinally through the bore, from the sonotrode head, into an internal thread on the vibrator, for fastening the sonotrode to the vibrator.

2. The device as claimed in claim 1, wherein
   the vibrator is a torsional vibrator,
   the sonotrode head can be excited by the vibration generator to perform torsional vibrations in relation to a torsion axis,
   said vibration generator, for exciting the torsional vibrations, interacts with the sonotrode via the torsional vibrator, which is coupled to the sonotrode in respect of torsional vibration, and
   the fastening screw is screwed into the torsional vibrator in the direction of the torsion axis so as to be supported on the sonotrode.

3. The device as claimed in claim 2, wherein
   at least one welding surface is arranged circumferentially on the sonotrode head, as seen in relation to the torsion axis,
   an anvil with a compacting surface is present, the compacting surface is arrangeable opposite the welding surface of the sonotrode, in a fixed state in relation to the welding surface,
   in the case of an opposite arrangement, the welding surface and the compacting surface delimit a compacting space, provided for accommodating parts which are to be welded, in a direction perpendicular to the torsion axis.

4. The device as claimed in claim 2, wherein the vibration generator is designed for generating longitudinal vibrations and is arranged perpendicularly to the torsion axis of the sonotrode.

5. The device as claimed in claim 2, wherein the vibration generator is in contact with the torsional vibrator, at a radial distance from the torsion axis, by way of an activator.

6. The device as claimed in claim 2, wherein the torsion axis coincides with a longitudinal axis of the sonotrode.

7. The device as claimed in claim 3, wherein the sonotrode head protrudes transversely to the torsion axis, at a free end of the sonotrode, and at least one welding surface is arranged circumferentially on the sonotrode head, as seen in relation to the torsion axis, and the welding surface extends in the direction of the torsion axis over the entire longitudinal dimension of the sonotrode head.

8. A mobile welding apparatus having an ultrasonic welding device as claimed in claim 1.

9. The mobile welding apparatus as claimed in claim 8, wherein the mobile welding apparatus is connected to a stationary supply unit via a supply line.

10. The device as claimed in claim 1, wherein the fastening screw contains a screw head which is arranged in the countersunk hole and supported on the floor of the countersunk hole.

11. A device for welding metal parts by ultrasound, the device comprising:
   a sonotrode with a sonotrode head, which can be excited by a vibration generator to perform vibrations,
   wherein the vibration generator, for generating the vibrations, interacts with the sonotrode via a vibrator which is vibrationally coupled to the sonotrode, and the sonotrode is connected to the vibrator with a screw connection,
   a countersunk hole is formed for access from a rear longitudinal end of the vibrator in a longitudinal direction thereof, the vibrator has a longitudinally continuous bore on a floor of the countersunk hole, and an internal thread is formed in the sonotrode, a fastening screw is screwed longitudinally through the bore, from the vibrator into the internal thread, for fastening the vibrator to the sonotrode.

12. The device as claimed in claim 11, wherein the fastening screw contains a screw head which is arranged in the countersunk hole and supported on the floor of the countersunk hole.

13. The device as claimed in claim 11, wherein
   the vibrator is a torsional vibrator,
   the sonotrode head can be excited by the vibration generator to perform torsional vibrations in relation to a torsion axis,
   said vibration generator, for exciting the torsional vibrations, interacts with the sonotrode via the torsional vibrator which is coupled to the sonotrode in respect of torsional vibration, and
   the fastening screw is screwed into the torsional vibrator in the direction of the torsion axis so as to be supported on the sonotrode.

14. The device as claimed in claim 13, wherein
   at least one welding surface is arranged circumferentially on the sonotrode head, as seen in relation to the torsion axis, and
   an anvil with a compacting surface is present, the compacting surface is arrangeable opposite the welding surface of the sonotrode, in a fixed state in relation to the welding surface,
   in the case of an opposite arrangement, the welding surface and the compacting surface delimit a compacting space, provided for accommodating parts which are to be welded, in a direction perpendicular to the torsion axis.

15. The device as claimed in claim 14, wherein the vibration generator is designed for generating longitudinal vibrations and is arranged perpendicularly to the torsion axis of the sonotrode.

16. The device as claimed in claim 14, wherein the vibration generator is in contact with the torsional vibrator, at a radial distance from the torsion axis, by way of an activator.

17. The device as claimed in claim 14, wherein the torsion axis coincides with a longitudinal axis of the sonotrode.

18. The device as claimed in claim 14, wherein the sonotrode head protrudes transversely to the torsion axis, at a free end of the sonotrode, and at least one welding surface is arranged circumferentially on the sonotrode head, as seen in relation to the torsion axis, and the welding surface extends in the direction of the torsion axis over the entire longitudinal dimension of the sonotrode head.

19. A mobile welding apparatus having an ultrasonic welding device as claimed in claim 11.

20. The mobile welding apparatus as claimed in claim 19, wherein the mobile welding apparatus is connected to a stationary supply unit via a supply line.

* * * * *